(12) United States Patent
Sha et al.

(10) Patent No.: US 8,557,081 B2
(45) Date of Patent: Oct. 15, 2013

(54) METHOD OF INSTALLING A PRESSING BLOCK SUIT OF A SOLAR PANEL

(76) Inventors: Yan Sha, Shanghai (CN); Xiaolin Sha, Shanghai (CN)

( * ) Notice: Subject to any disclaimer, the term of this patent is extended or adjusted under 35 U.S.C. 154(b) by 112 days.

(21) Appl. No.: 13/181,514

(22) Filed: Jul. 13, 2011

(65) Prior Publication Data

US 2012/0255675 A1    Oct. 11, 2012

(30) Foreign Application Priority Data

Apr. 11, 2011 (CN) .......................... 2011 1 0090144

(51) Int. Cl.
| | | |
|---|---|---|
| *B29C 65/00* | (2006.01) | |
| *B32B 37/00* | (2006.01) | |
| *B32B 38/00* | (2006.01) | |
| *B31B 1/60* | (2006.01) | |
| *H02N 6/00* | (2006.01) | |
| *H01L 31/042* | (2006.01) | |
| *B23P 19/00* | (2006.01) | |

(52) U.S. Cl.
USPC .............. 156/281; 156/60; 136/251; 136/244; 29/739

(58) Field of Classification Search
USPC ................ 156/281, 60; 136/251, 244; 29/739
See application file for complete search history.

(56) References Cited

U.S. PATENT DOCUMENTS

| | | | | |
|---|---|---|---|---|
| 4,097,308 A | * | 6/1978 | Klein et al. .................... | 136/251 |
| 6,013,871 A | * | 1/2000 | Curtin ........................... | 136/251 |
| 6,672,018 B2 | * | 1/2004 | Shingleton .................... | 52/173.3 |
| 2008/0110492 A1 | * | 5/2008 | Buller et al. .................. | 136/251 |
| 2008/0245404 A1 | * | 10/2008 | DeLiddo ....................... | 136/251 |
| 2010/0263709 A1 | * | 10/2010 | Norman et al. ............... | 136/246 |

* cited by examiner

*Primary Examiner* — Christopher Schatz
*Assistant Examiner* — Matthew Hoover

(57) ABSTRACT

A method of installing a pressing block suit of a solar panel to a mounting body, in the method, a pressing block suit of the solar panel is adhered to the mounting body with an adhesive or directly without adhesive. The processes of the method is easy and convenient, the cost of installing is reduced.

5 Claims, 5 Drawing Sheets

METHOD OF INSTALLING A PRESSING BLOCK SUIT OF A SOLAR PANEL

BACKGROUND OF THE PRESENT INVENTION

1. Field of Invention

The present invention relates to a solar panel, and more particularly to a method of installing a pressing block suit of a solar panel.

2. Description of Related Arts

As clean and environmental energy, the solar energy becomes more and more important to people. The electric technology of solar cell is developed rapidly, especially the solar cell electric system which is installed on the buildings is used more and more widely for the features of being unlimited by installation ground.

As an important part of the construction of a solar energy integrated system, the installation of the solar panel is paid more attention by people. According to the prior art, the method of installing a holder on a roof of a building is mainly divided into four parts: removing the covering materials of the roof, finding out the supporting girder of the roof, then fixing the Z shape hook supporting leg member to the girder with the steel wire and fixing the installing slideway to the Z shape hook with a rail connecting and fixing member, at last adopting a way that the pressing block of the solar panel engages mechanically to the screw nut of the rail to lock and cooperate with the solar panel. So the traditional installing method has the following disadvantages:

These procedures are complicated, the covering materials of the roof are removed before installing, and the hook supporting leg is fixed to the girder;

Because of the installing procedures, materials are wasted and the weight of the solar panel equipment is added, so that the load-bearing of the roof covering of the building is in a high demand;

The water-proof and the supporting structure of the roof covering are destroyed, so that the cost of later maintenance is increased.

The applicant has applied for a method of installing a solar panel in China, the patent application number is CN2010604188.2, the method provides that the solar panel is adhered to the macromoleclar polymer fiberglas bonding (Commonly known as waterproof rolls), and then the macromoleclar polymer fiberglas bonding is adhered to the buildings. However, not all buildings are suitable for being adhered the macromoleclar polymer fiberglas. For instance, the roof with the color steel tiles has a rugged surface which is not adapted to adhere; and some roofs adopt the PVC waterproof rolls (one kind of the macromoleclar polymer fiberglas bonding), and are not needed to adhere another macromoleclar polymer fiberglas bonding.

A problem to be solved is how to reduce the weight of the installing member of the solar panel and install the installing member to the buildings with any shape and material fixedly under the circumstance that the buildings themselves are not destroyed.

SUMMARY OF THE PRESENT INVENTION

Accordingly, in order to solve the above problem, the present invention provides a method of installing a pressing block suit of a solar panel, in the method, a weight of a mounting body is reduced, holes is not needed to be made on the mounting body, a complex water proof treatment is omitted and the installing is easy and convenient.

The present invention is achieved as follows.

A method of installing a pressing block suit of a solar panel to a mounting body, comprises following steps:

(1) depending on a specific circumstance of the mounting body, determining an installing number of the pressing block suits and installing places of each pressing block suiton the mounting body, wherein the pressing block suit has a bottom adhering surface for covering on the mounting body, provided at a bottom of the pressing block suit, and a pressing block nip comprising an upper portion and a lower portion which are interlocked with each other via a mechanical means to form at least one adjustable inner cavity for embedding and fixing an edge of the solar panel;

(2) cleaning an installing position of the mounting body, wherein an cleaning area is equal to or slightly bigger than an area of the bottom adhering surface of the pressing block suit;

(3) without breaking the mounting body, mounting the bottom adhering surface of the pressing block suit onto a corresponding installing position of the mounting body via an adhesive; and (4) sealing a commissure between the mounting body and the pressing block suit.

The cleaning area can be approximately equal to and/or bigger than the area of the bottom adhering surface. In some embodiments the cleaning area is not less than, or not substantially less than, the area of the bottom adhering surface.

The adhesive is a two-component epoxy resin.

Alternatively, the adhesive is a polyurethane resin.

Alternatively, the adhesive is a two-component acrylic resin.

A certain distance, e.g. a gap, is provide between the pressing block nip of the pressing block suit and the bottom adhering surface for the solar panel installed in the pressing block nip to dissipate heat.

The bottom adhering surface of the pressing block suit is in a material of metal.

The pressing block suit comprises a base, wherein the bottom adhering surface is set on the base, and a pressing block which has a pressing block nip which is adjustable for embedding and fixing an edge of the solar panel into the pressing block nip, wherein the base has a certain height, in such a manner that a certain distance is between the pressing block nip and the bottom adhering surface, for the solar panel installed in the pressing block nip to dissipate heat.

The pressing block suit further comprises a plurality of shims, the shims have a certain thickness, the shims are set between the pressing block and the base for adjusting the distance between the pressing block and the base to adjust a distance between the pressing block nip and the mounting body, so as to make the pressing block nips which are used to install and fix the solar panel in a same plane.

Furthermore, the base has a guiding groove, the guiding groove has a certain length, the pressing block can adjust its installing position within the limit of the length of the guiding groove.

Alternatively, a shape of the bottom adhering surface matches with a raised shape of the mounting body, during installing, the bottom adhering surface fits the raised part of the mounting body to fix and adhere.

Alternatively, the bottom adhering surface of the base is a locking groove, a shape of the locking groove matches the raised shape of the mounting body, during installing, the locking groove locks the raised part of the mounting body to fix.

Optionally, the pressing block suit comprises a pressing block and a sunk screw which penetrates into the pressing block from bottom to top, a head of the sunk screw and a bottom surface of the pressing block form a bottom adhering surface, the bottom adhering surface adheres to the mounting body, the pressing block has a pressing block nip which is adjustable for embedding and fixing an edge of the solar panel into the pressing block nip.

Optionally, the pressing block suit is a pressing block, the bottom adhering surface is set on the pressing block for adhere the pressing block to the mounting body, the pressing block has a pressing block nip which is adjustable, a certain distance is between the pressing block nip and the bottom adhering surface.

The sealing is painting a layer of lacquer or silica gel to a commissure between the mounting body and the pressing block suit.

The present invention has the following advantages:

adopting a way of adhering directly and thus holes on the roof is not needed, so that the integrity of the mounting body is protected; the hook supporting legs and the slideways are abandoned, a demand of load-bearing is reduced greatly, so that the application range of the solar panel is amplified greatly; designing specially to the mounting body with different shapes which can satisfy characteristic demands; and the installing processes is easy and convenient, so that the cost and fees of installing are reduced.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1 to FIG. 9 of the drawings, the present invention is illustrated through the following preferred embodiments.

Figure 1:
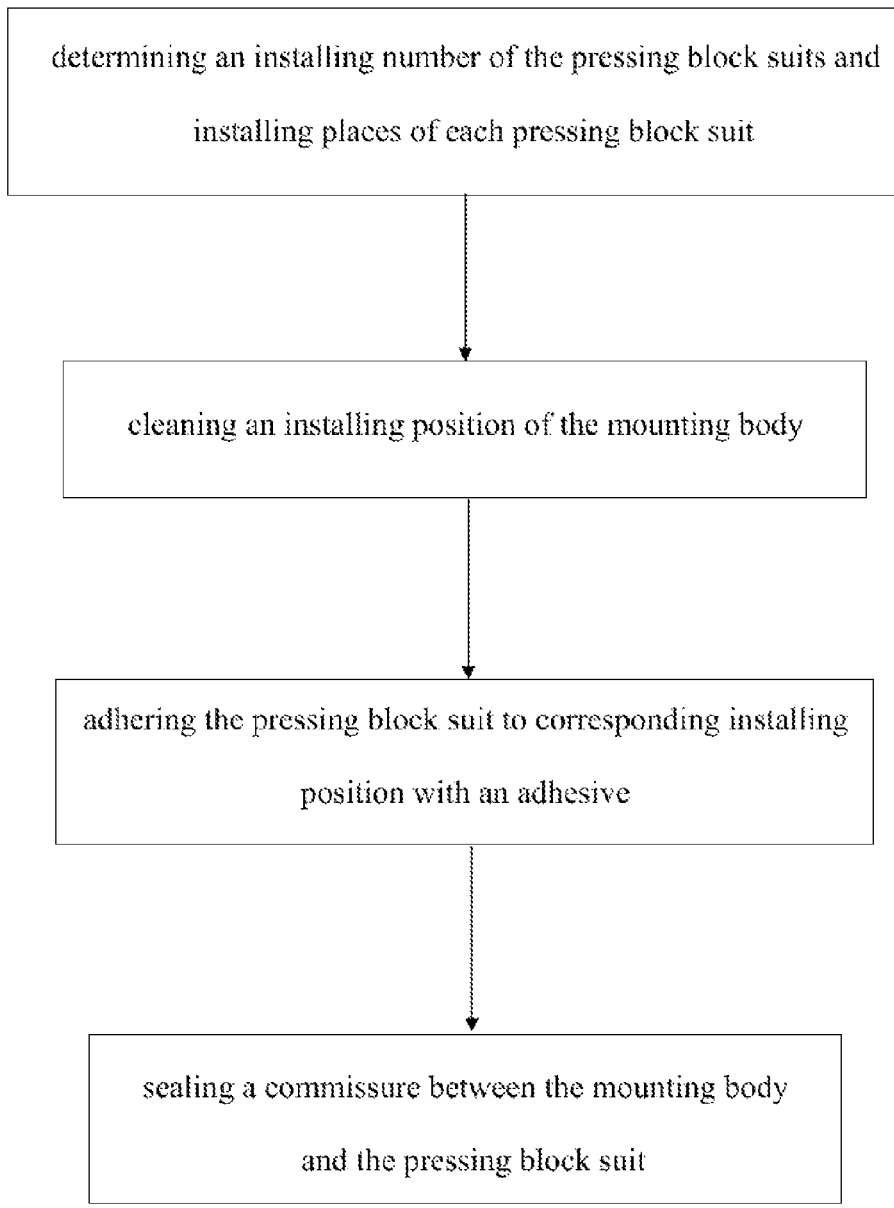
FIG. 1 is a process diagram of a method of installing a pressing block suit of a solar panel.
Figure 2:
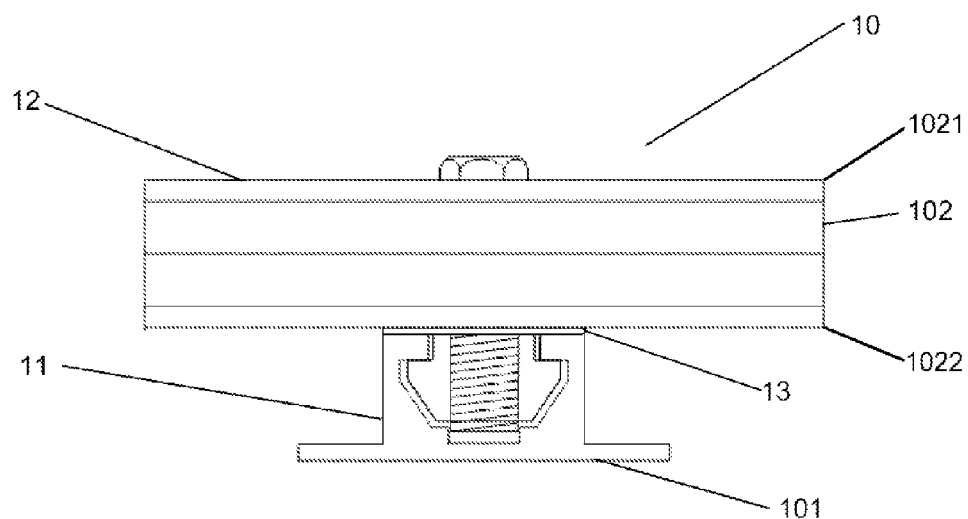
FIG. 2 is a left view of the pressing block suit according to a first preferred embodiment of the present invention.

A method of installing a pressing block suit 10 of a solar panel, wherein the pressing block suit 10 is adhered to a mounting body directly with an adhesive 20, as referring to FIG. 1, comprises:

(1) depending on a specific circumstance of the mounting body, such as a shape or a size, determining an installing number of the pressing block suits 10 and installing positions of each pressing block suit 10 that are on the mounting body, wherein the pressing block suit 10 has a bottom adhering surface 101 for adhering to the mounting body and a pressing block nip 102 comprising an upper portion 1021 and a lower portion 1022 which are interlocked with each other via a mechanical means to form at least one adjustable inner cavity for embedding and fixing an edge of the solar panel, as referring to FIG. 2;

(2) cleaning an installing position of the mounting body, wherein an cleaning area is equal to or slightly bigger than an area of the bottom adhering surface 101 of the pressing block suit 10;

(3) adhering the pressing block suit 10 to corresponding installing position with an adhesive 20;

(4) sealing a commissure between the mounting body and the pressing block suit 10.

The sealing is painting a layer of lacquer between the pressing block suit 10 and the mounting body, or using a silica gel to seal the commissure between the pressing block suit 10 and the mounting body. The sealing process can protect the adhesive 20 from oxidation and thus prevent aging and extending the adhering life.

In the step (1), an installing density of the pressing block suits 10 is need to be determined before determining the installing number of the pressing block suits 10 and the installing positions of each pressing block suit 10, and the installing density is determined by a specific circumstance of a locatin of the mounting body. For instance, in a place with a small wind pressure or snow pressure, a small number of the pressing block suit 10 can meet a demand of fixing the solar panel. But in a place with a big wind pressure or snow pressure, a large number of the pressing block suit 10 have to be increased to increase firmness. Additionally, an area of the bottom adhering surface 101 is need to be considered in determining the density of the pressing block suit 10. The larger the area of the bottom adhering surface 101, the higher the firmness is, thus the installing density of the pressing block suit 10 can be smaller relatively, conversely, the installing density of the pressing block suit 10 should be bigger relatively.

In the step (3), one can adopt an adhesive 20 with a long hardening time which is convenient for adjusting an adhering position of the pressing block suit 10 during installing.

Because installing solar panel is an outdoor operation, beside strong adhering ability, the adhesive 20 which adheres the pressing block suit 10 to the mounting body directly need to have a following features: anti-aging, anti-climatic change, anti-acid and alkali, and the adhering life is not short than a life of the solar panel.

In the preferred embodiment, the adhesive 20 is a two-component epoxy resin, a polyurethane resin or a two-component acrylic resin.

The two-component epoxy resin has a strong adhesiveness which can adhere the pressing block suit 10 to the mounting body which is a steel plate, a concrete, a wood, PVC rolls, rubber, rigid plastics and other materials, the two-component epoxy resin is especially applied to adhere two objects of metal material, so that the bottom adhering surface 101 of the pressing block suit 10 in metal material is adaptive to be adhered to the roof of the color steel tiles. And the two-component epoxy resin has the following features; anti-aging, corrosion-resistant, high mechanical strength and good insulativity. What's more important is that the epoxy resin is nontoxic, people's body will not be hurt and an environment will not be destroyed which meets a demand of environmental protection.

An adhesiveness of the polyurethane resin is stronger that the two-component epoxy resin and cheaper, in some conditions, when the two-component epoxy resin is not adaptive, the polyurethane resin is used. The polyurethane resin has a ductility after hardening that is similar to the two-component epoxy resin which resists an instantaneous force, so that the solar panel can resist a higher level wind.

The two-component acrylic resin has the strongest adhesiveness among the three, the two-component acrylic resin has a low demand in choosing a material of a adhering surface, the surfaces of two metals materials are especially adoptive, and the hardening time is short, so the installing time is shortened. But the two-component acrylic resin has a low colloid ductility and the gas released is bad to the body of people.

Furthermore, a certain distance is between the pressing block nip 102 of the pressing block suit 10 and the bottom adhering surface 101, that is a certain distance formed between the solar panel in the pressing block nip 102 and the mounting body which is good for dissipating heat.

Figure 3:
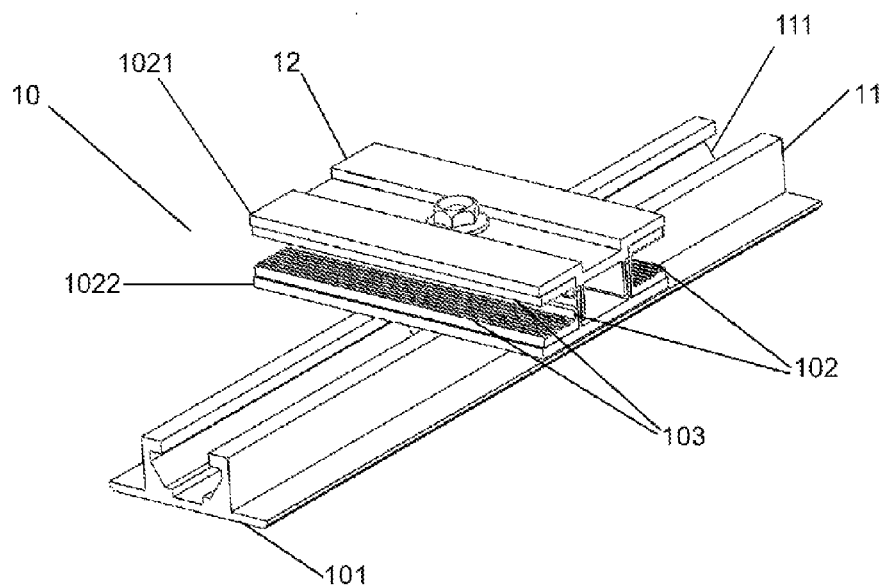
FIG. 3 is a schematic view of a base with a guiding groove of the pressing block suit according to the first preferred embodiment of the present invention.

An elastic material 103 is embedded in the adjustable inner cavity of the pressing block nip 102, such as a rubber layer, which protects the solar panel, as showed in FIG. 3.

Preferably, the pressing block suit 10 and the bottom adhering surface 101 is in the metal materials, such as an aluminium alloy.

According to different demands of the pressing block suit 10, different preferred embodiment is provided.

A first preferred embodiment is provided below.

Referring to FIG. 2, the pressing block suit 10 comprises a base 11 and a pressing block 12. The base 11 is adhered to the mounting body directly, the pressing block 12 is set on the base 11. The pressing block 12 has an adjustable pressing block nip 102 comprising an upper portion 1021 and a lower portion 1022 which are interlocked with each other via a mechanical means to form at least one adjustable inner cavity for embedding and fixing an edge of a solar panel.

The bottom adhering surface 101 is set on the base 11, the bottom adhering surface 101 has a certain area to ensure a firmness for adhering to the mounting body, the bigger area the adhering surface is, the higher the firmness is. The base 11 has a certain height, so that a certain distance is between the pressing block 12 and the mounting body, that is a certain distance between the solar panel in the pressing block nip 102 of the pressing block 12 and the mounting body which is good for dissipating heat. Meanwhile, the pressing block 12 is set on the base 11 with a nut, the base 11 needs to have a certain height, so that a space in the base 11 is big enough for receving the fabricated nut to produce an enough threaded tight force to fix the pressing block 12.

Preferably, the base 11 is in a metal material, the pressing block 12 can be a metal, a plastic, a wood and other materials.

In actual condition, because of the faults in installing or reasonable error within bounds, some mounting bodies are not very smooth, some places are lower and some places are higher. So if the same pressing block suit 10 are adopted to install on the places higher or lower, the pressing block nips 102 are not ensured in a same plane, difficulties are appeared in installing the solar panel.

In order to solve the problem, referring to FIG. 2, the pressing block suit 10 further comprises a plurality of shims 13, the shims 13 have a certain thickness which is installed between the pressing block 12 and the base 11 to adjust the distance between the pressing block 12 and the base 11, so as to adjust the distance between the pressing block nip 102 and the mounting body, in such a manner that the pressing block nips 102 that are used to install and fix a same solar panel are in a same plane.

Concretely, when the pressing block suit 10 is installed to a slight lower position on the mounting body, one or more shims 13 can be installed between the pressing block 12 and the base 11 to increase the distance between the pressing block nip 102 of the pressing block 12 and the mounting body; conversely, when the pressing block suit 10 is installed to a slight higher position on the mounting body, no shims 13 are installed between the pressing block 12 and the base 11. The distance between the pressing block 12 and the mounting body is adjusted through installing or not installing, installing one shim or installing a plurality of shims between the pressing block 12 and the base 11, and also the distance between the pressing block nip 102 and the mounting body, which will achieve that the pressing block nips 102 that are used to install and fix a same solar panel are in a same plane and the solar panel is installed smoothly and steadily.

Alternatively, referring to FIG. 3, the base 11 has a guiding groove 111, the bottom adhering surface 101 is set on a bottom of the guiding groove 111, the guiding groove 111 has a certain length, the pressing block 10 can adjust its installing position within a limit of the length of the guiding groove 111, which is convenient for installing the solar panel.

Figure 4:
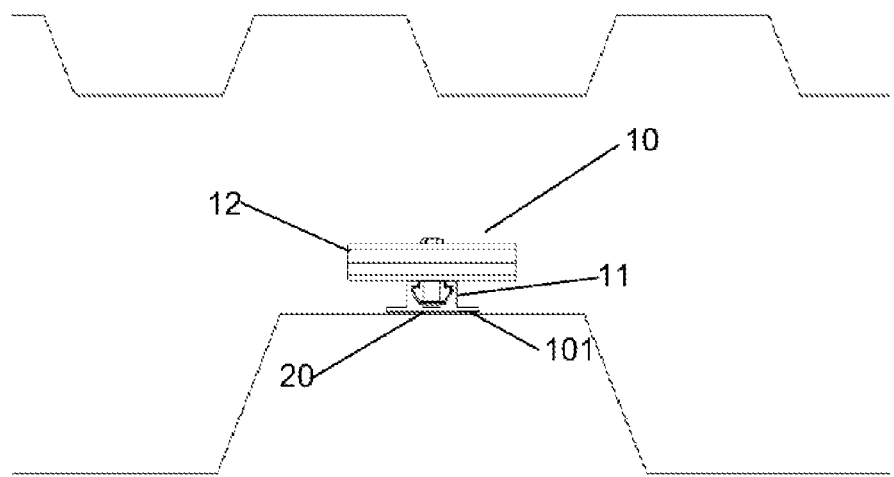
FIG. 4 to FIG. 6 is a left view of the pressing block suit according to the first preferred embodiment of the present invention, illustrating that a bottom adhering surface matches the raised parts of the mounting body with different shapes.
Figure 5:
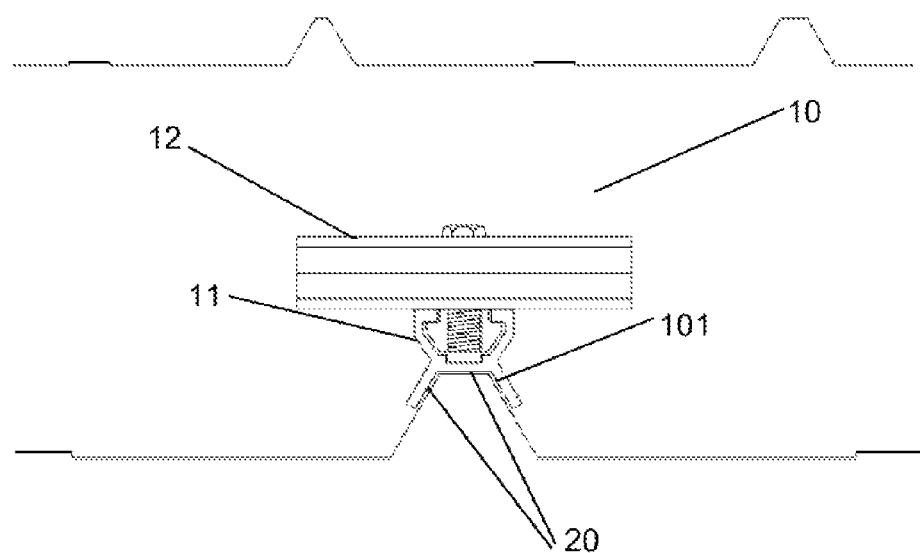
Figure 6:
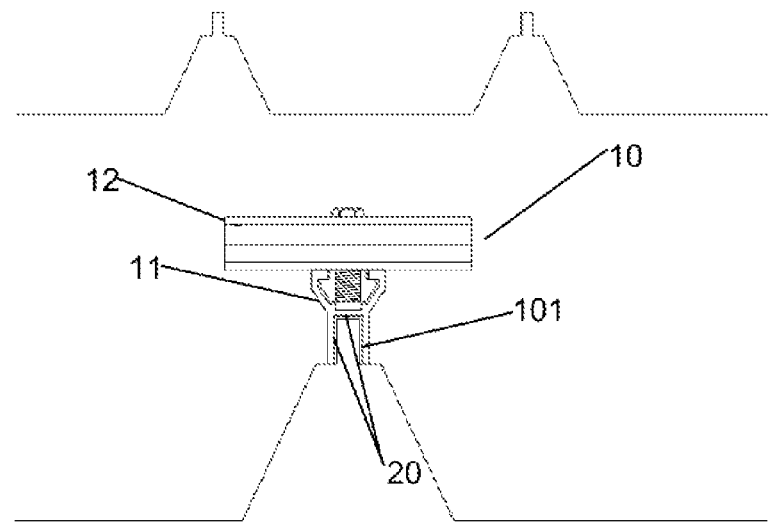

Alternatively, to mounting body such as the color steel tiles having a strip embossment, the shape of the bottom adhering surface 101 of the base 11 matches the shape of the strip embossment, so that the bottom adhering surface 101 of the base 11 fits the shape of the strip embossment to adhere and fix during installing, it is convenient to install and the installing is more firmed. To the color steel tiles with different shapes, the shapes of the base 11 which matches the color steel tiles with different shapes are adopted to install. Referring to FIG. 4, FIG. 5 and FIG. 6.

Figure 7:
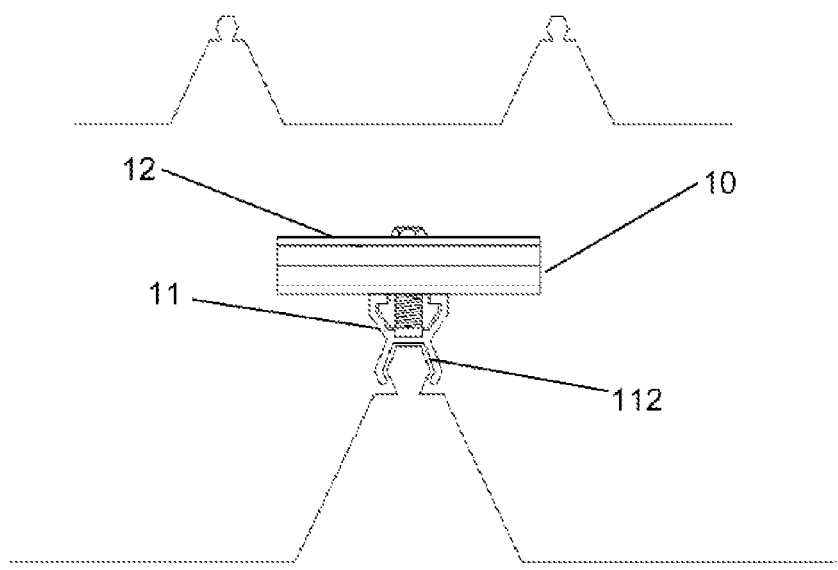
FIG. 7 is a left view of the pressing block suit according to the first preferred embodiment of the present invention, illustrating that the bottom adhering surface is a locking groove.

Alternatively, referring to FIG. 7, the bottom adhering surface of the base11 is a locking groove 112, some strip embossment of the color steel tile has a lockable position, to the kind of mounting body, a shape of the locking groove 112 matches with the raised shape of the mounting body, the locking groove 112 can be locked to the embossment of the mounting body to fix to the embossment of the mounting body. In installing, the locking groove 112 is only needed to be locked to the embossment of the mounting body, adhering the adhesive 20 is not needed. One can also adhere with the adhesive 20 to increase the firmness further.

In the first preferred embodiment, one can install the base 11 to the mounting body firstly and then install the pressing block 12 to the base 11; one can also install the pressing block 12 to the base 11 firstly and then install the whole pressing block suit 10 to the mounting body.

A second preferred embodiment is provided below.

Figure 8:
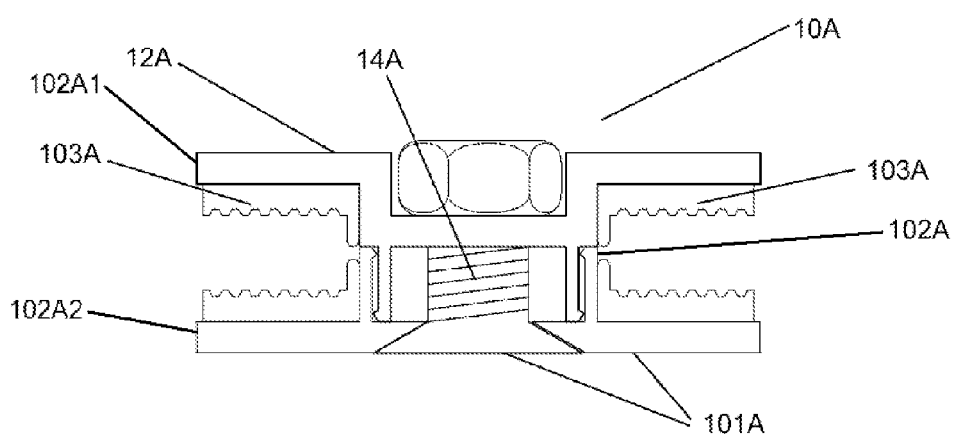
FIG. 8 is a sectional view of the pressing block suit according to a second preferred embodiment of the present invention.
Figure 9:
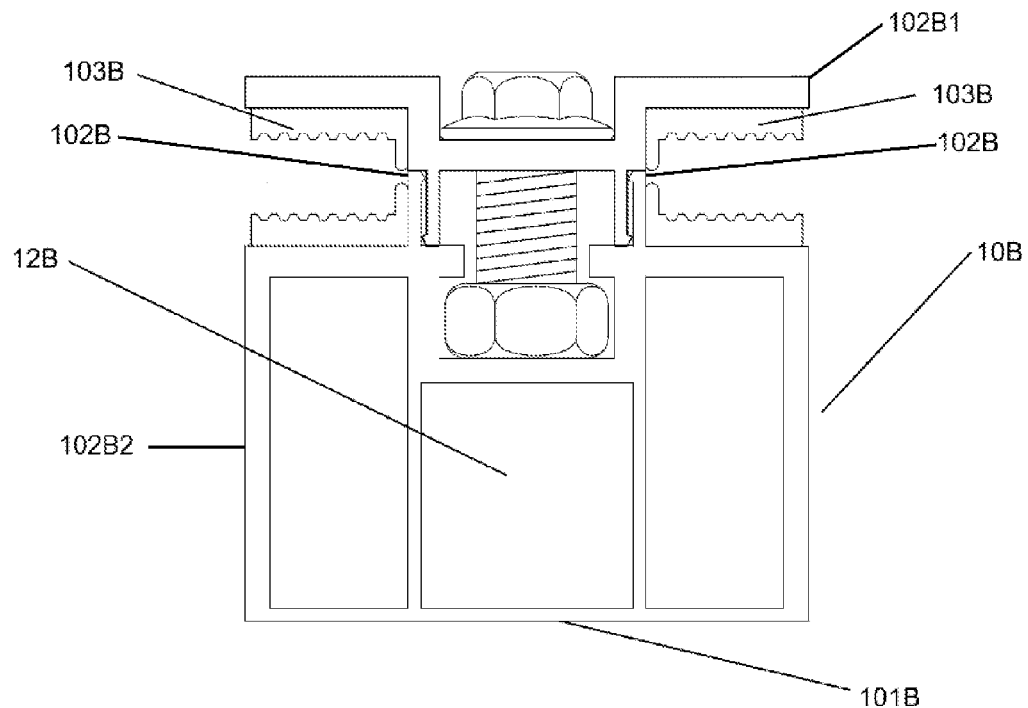
FIG. 9 is a sectional view of the pressing block suit according to a third preferred embodiment of the present invention.

Referring to the FIG. 8, the pressing block suit 10A comprises a pressing block 12A and a sunk screw 14A which penetrates into the pressing block 12A from bottom to top, a head of the sunk screw 14A and a bottom surface of the pressing block 12A form a bottom adhering surface 101A, the bottom adhering surface 101A adheres to the mounting body. The pressing block 12A has a pressing block nip 102A comprising an upper portion 102A1 and a lower portion 102A2 which are interlocked with each other via a mechanical means to form at least one adjustable inner cavity for embedding and fixing an edge of a solar panel. An elastic material 103A is embedded in the adjustable inner cavity of the pressing block nip102A to protect the solar panel.

A third preferred embodiment is provided below.

The pressing block suit 10B is a pressing block 12B, the bottom adhering surface 101B is set on the pressing block 12B to adhere the pressing block 12B to the mounting body directly, and therefore a base is not needed. The pressing block 12B has a pressing block nip 102B comprising an upper portion 102B1 and a lower portion 102B2 which are interlocked with each other via a mechanical means to form at least one adjustable inner cavity for embedding and fixing an edge of a solar panel. A certain distance is between the pressing block nip 102B and the bottom adhering surface 101B, that is a certain distance is between the solar panel in the pressing block nip 102B and the mounting body, which is good for dissipating heat. An elastic material 103B is embedded in the adjustable inner cavity of the pressing block nip 102B to protect the solar panel.

At present, the roofs of super stores and factory buildings are mainly adopted a structure of color steel tiles, this kind of super buildings have enough space and are necessary to use the solar panel to generate electricity. In the preferred embodiments of the present invention, taking the color steel tiles for example to describe in detail.

A method of installing a pressing block suit 10 of a solar panel to color steel tiles, comprising following steps:

(1) depending on a shape of a roof of the color steel tiles, choosing the pressing block suit 10 that the shape of the bottom adhering surface 101 matches the raised shape of the color steel tiles;

(2) depending on the shape, the size or other concrete conditions of the roof of the color steel tiles and the wind pressure or snow pressure of the installing place, determining the installing number of the pressing block suit 10 and the position of each pressing block suit 10;

(3) cleaning an installing position of the color steel tiles, wherein an cleaning area is equal to or slightly bigger than an area of the bottom adhering surface 101 of the pressing block suit 10;

(4) adhering the pressing block suit 10 to the corresponding installing position on the roof of the color steel tiles with the two-component epoxy resin;

if the pressing block suit 10 that the bottom adhering surface thereof is the locking groove 112 is adopted, the locking groove 112 is only needed to be locked to the embossment of the color steel tiles. Of course in the place with the high wind pressure and snow pressure, the two-component epoxy resin can be adopted to increase the firmness;

(5) sealing the commissure between the pressing block suit 10 and the color steel tiles with the silica gel.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

The invention claimed is:

1. A method of installing a pressing block suit of a solar panel to a mounting body, comprising following steps:
   (1) depending on a specific circumstance of said mounting body, determining an installing number of said pressing block suit and an installing position of each pressing block suit that are on said mounting body, wherein each said pressing block suit has a bottom adhering surface for covering on said mounting body, provided at a bottom of said pressing block suit, and a pressing block nip comprising an upper portion and a lower portion which are interlocked with each other via a mechanical means to form at least one adjustable inner cavity for embedding and fixing an edge of said solar panel;
   (2) cleaning said installing position of said mounting body, wherein a cleaning area is equal to or slightly bigger than an area of said bottom adhering surface of said pressing block suit;
   (3) without breaking said mounting body, mounting said bottom adhering surface of said pressing block suit onto a corresponding installing position of said mounting body via an adhesive; and
   (4) sealing a commissure between said mounting body and said pressing block suit;
   wherein a certain distance is created between said pressing block nip of said pressing block suit and said bottom adhering surface for said solar panel installed in said adjustable inner cavity to dissipate heat; and
   wherein said pressing block suit comprises a pressing block and a sunk screw which penetrates into said pressing block from bottom to top, wherein a head of said sunk screw and a bottom surface of said pressing block form said bottom adhering surface for covering on said mounting body; said bottom adhering surface for covering on said mounting body is mounted on said mounting body; and said pressing block has said pressing block nip.

2. The method as recited in claim 1, wherein further said bottom adhering surface for covering on said mounting body is a locking groove which is able to contain and lock said raised part of said mounting body therein without breaking said mounting body.

3. The method as recited in claim 2, wherein said base has a guiding groove; said guiding groove has a certain length; and said pressing block is able to adjust an installing position of said pressing block within a limit of said length of said guiding groove.

4. The method as recited in claim 3, wherein said lower portion of said pressing block nip has a certain height for creating said certain distance.

5. The method as recited in claim 4, wherein said step (4) comprises painting a layer of lacquer to said commissure between said mounting body and said pressing block suit.

* * * * *